(No Model.)
J. CHANDLER.
GATE.
No. 383,213. Patented May 22, 1888.
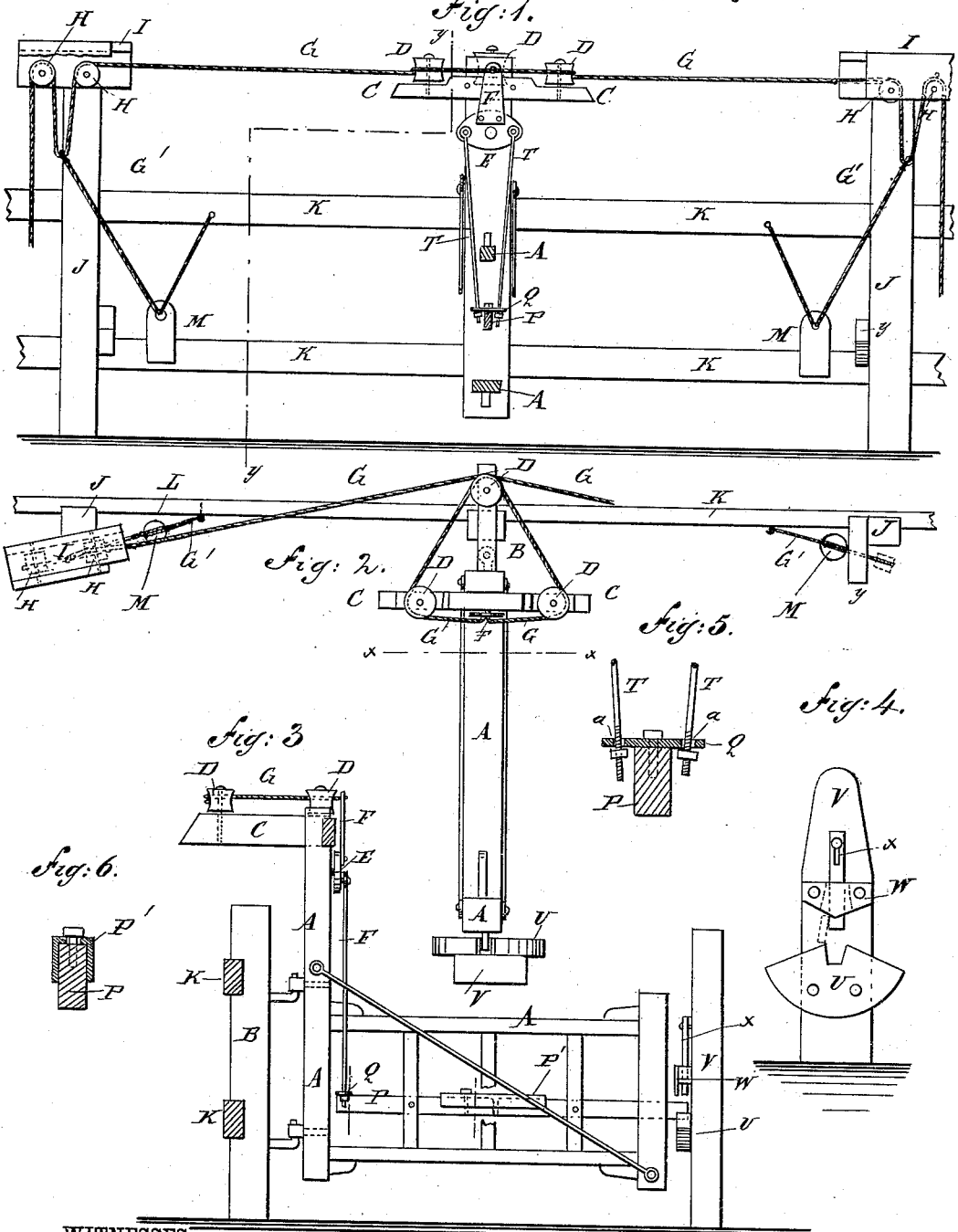

UNITED STATES PATENT OFFICE.

JESSE CHANDLER, OF RED STONE, KANSAS.

GATE.

SPECIFICATION forming part of Letters Patent No. 383,213, dated May 22, 1888.

Application filed September 13, 1887. Serial No. 249,566. (No model.)

*To all whom it may concern:*

Be it known that I, JESSE CHANDLER, of Red Stone, in the county of Cloud and State of Kansas, have invented certain new and useful Improvements in Gates, of which the following is a full, clear, and exact description.

Reference is to be had to the accompanying drawings, forming part of this specification, in which similar letters of reference indicate corresponding parts in all the figures.

Figure 1 is a front elevation of one of my improved gates, the gate proper being shown in section through the line $x\,x$, Fig. 2, and part being broken away. Fig. 2 is a plan view of the same. Fig. 3 is a sectional side elevation of the same taken through the broken line $y\,y$, Fig. 1. Fig. 4 is a front elevation of the latch-post. Figs. 5, 6, and 7 are detail views.

The object of this invention is to facilitate the opening and closing of gates and promote reliability in the action of said gates.

The invention consists in the peculiar construction and arrangement of parts, as hereinafter described, and pointed out in the claims.

A represents the gate proper, which may be made in any suitable manner, and is hinged to a post, B. The rear end bar of the gate A is extended upward, and to its upper end is attached a three-armed frame, C, to the upper sides of the outer ends of which are pivoted pulleys D.

To the forward side of the upper part of the rear end bar of the gate A is centrally pivoted an oval-shaped lever, E, provided with an upwardly-extending triangular arm, F, formed upon or attached to its upper edges. The upper end of the said arm of the lever E is upon a level with the pulleys D, and to the said upper end are attached the ends of two ropes, G, or the center of a single rope. The ropes G pass in opposite directions around the side pulleys D and the rear pulley D, as shown in Fig. 2, and then pass in opposite directions along the side of the roadway.

At a suitable distance from the hinge-post B each of the ropes G passes over two pulleys, H, pivoted at a little distance apart to a box, I, secured to the upper end of an upright, J, set in the ground and connected with the said hinge-post B by one or more bars, K, to strengthen the said uprights in position.

Each rope G properly passes over the outer pulley H, and at a point in advance of the inner pulley a second rope, G', is spliced thereto, which is attached at its other end to one of the bars K, as shown in Fig. 1. Upon each rope G', between the inner pulley and the point of attachment, is suspended a weight, M, of sufficient gravity to keep the rope G taut and raise the end of the rope by which the gate is operated from the ground when released.

In short slots in the upright bars of the gate A is placed the latch P, which is pivoted near its rear end to the said gate A. The said latch P is divided, preferably, to the rear of the center, and over this joint and fastened to the shorter section of the latch a cap, P', is placed, U-shaped in cross-section, as illustrated in Fig. 6. The top of the cap is slotted, the object of the slot being to enable the cap to be adjusted to vary the leverage at the rear end of the latch.

To the upper rear end of the latch P a cross-bar, Q, is attached, provided with an aperture, $a$, near each extremity, into which apertures rods T are entered, provided below the same with a nut or equivalent device to prevent their being withdrawn, and the upper ends of the rods T are attached, respectively, at each end of the lever E. Thus when, by the action of the ropes G, the lever E is rocked, one rod will be raised up, carrying with it the latch, and the outer rod will pass down through the aperture in the cross-bar.

The forward end of the latch P projects so as to engage with the catch U, attached to the latch or front post, V.

The catch U is made with a recess in the center of its upper edge and with an upward incline on each side of the said recess to raise the latch, so that it will drop into the said recess. Above the catch U is placed a block, W, the lower edge of which is made with a downward incline on each side of its center to cause the forward end of the latch P to descend should it be in a raised position when the gate swings shut. The guide-block W is recessed or mortised to receive the latch-stop X, the said mortise being made sufficiently wide to allow the lower end of the latch-stop X to have so much lateral movement as will allow the latch P to enter and leave the recess in the catch U. The upper end of the latch-stop X is slotted to receive the screw that secures it to and suspends it from the post V. The stop X acts so as to prevent the latch P from being carried past the recess in the catch U and to prevent the said latch P from rebounding. The slot in the stop allows the stop to be lifted by the latch, and thus to be out of the way in opening the gate. When the stop is pushed forward by the latch, it is so inclined to the latch as to push the latch down into the recess U and prevent the gate from rebounding.

A catch, Y, is attached to the upright J, or other suitable support, on each side of the gateway and in such a position that the latch P will engage with it when the gate is swung open.

Having thus described my invention, what I claim as new, and desire to secure by Letters Patent, is—

1. The combination, with a gate, of a three-armed lever on the end bar of the gate, a sectional latch, rods pivoted to the opposite arms of the said lever and loosely connected to the rear section of the latch, and ropes connected to the other arm of the said lever, substantially as described.

2. The combination, with a gate, of a three-armed lever pivoted to the rear end bar of the gate, a sectional latch provided with an apertured cross-bar on its rear section, rods pivoted to the opposite arms of the said lever and having their lower ends projecting through the apertures of the said cross-bar of the latch and provided with nuts thereon, and ropes attached to the upwardly-projecting arm of the said lever, substantially as herein shown and described.

3. The combination, with the gate A, of the three-armed frame C on the upper end of the end bar of the gate and provided with pulleys D, the lever E, pivoted to the end bar of the gate and provided with the upwardly-projecting arm F, the sectional latch P, provided with the cross bar Q, having an aperture in each end, rods pivoted to the ends of the lever E and having their lower ends projecting through the apertures of the bar Q and provided with nuts thereon, and the ropes G, substantially as herein shown and described.

4. The combination, with the gate A and the operating cords or ropes G, of the uprights J, provided with the pulleys H, over which the operating cords or ropes pass, the cord G', secured to the operating-rope and to a support, and the weight M on said rope G', substantially as herein shown and described.

5. The combination, with a gate, of the sectional latch P and the slotted cap P', adjustably secured to the rear section of the latch and projecting over the front section of the said latch, substantially as and for the purpose set forth.

JESSE CHANDLER.

Witnesses:
PARK B. PULSIFER,
J. S. CAMPBELL.